July 3, 1962 C. A. SNYDER 3,041,808
FILTER
Filed Sept. 26, 1960

INVENTOR.
CLYDE A. SNYDER
BY:
Beau, Brooks, Buckley & Beau,
ATTORNEYS.

United States Patent Office 3,041,808
Patented July 3, 1962

3,041,808
FILTER
Clyde A. Snyder, Mishawaka, Ind., assignor to Bell Intercontinental Corporation, South Bend, Ind.
Filed Sept. 26, 1960, Ser. No. 58,405
6 Claims. (Cl. 55—304)

This invention relates to filtering devices for the removal of dust, dirt or other solid particles from air or other gaseous medium, and more particularly to that type of dust collector which makes use of a plurality of filter elements comprising tubes or sheets of fabric through which the air or other gaseous dust carrying medium is passed, for separation of the dust particles therefrom and collection upon the walls of the filter elements. More specifically, this invention pertains to filter devices of the type disclosed in my earlier Patent No. 2,143,663, wherein pluralities of tubular members of filtering fabric are suspended from their closed upper ends on shakable hanger rods while their open ends at the bottom are arranged to receive the dust or dirt-laden air or other gaseous medium.

When the accumulation of dirt or dust collected on the inner walls of the filter tubes reaches the point where it substantially interferes with the efficiency and operation of the device, the collected solids are shaken loose from the walls of the filter fabric by vigorous shaking of the tubes so that the accumulated layers of dust and dirt are allowed to fall downwardly through the open ends of the filter tubes and into a receiver for further disposal.

To facilitate the filtering action the interior or dust side of the filtering fabric is conventionally coated with finely ground asbestos particles known in the trade as asbestor "floats." This fibrous material adheres to the fabric and forms an effective dust barrier; but as stated hereinabove, when the collected dust forms a "cake" of substantial thickness after the filter is in use for some time, there is encountered a considerable loss of air flow. When this occurs it is necessary to shake the "cake" off the fabric, and because asbestos float clings so tenaciously to the fabric used, only violent shaking will free it such as often damages the expensive fabric and thereby causes considerable plant shut down loss time.

It is a primary object of the present invention to provide a method of preparing the filter fabric, so as to eliminate the aforementioned operational problem.

Another object of this invention is to provide a filter element from which the caked-on dirt, etc., can be readily removed, without damage to the fabric itself.

Another object is to provide a filter as aforesaid which is capable of removing from entraining air finer particles than heretofore possible.

Figure 1:
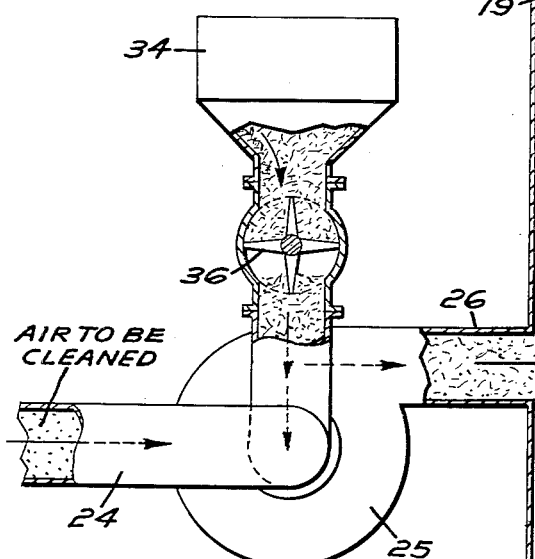
Figure 2:
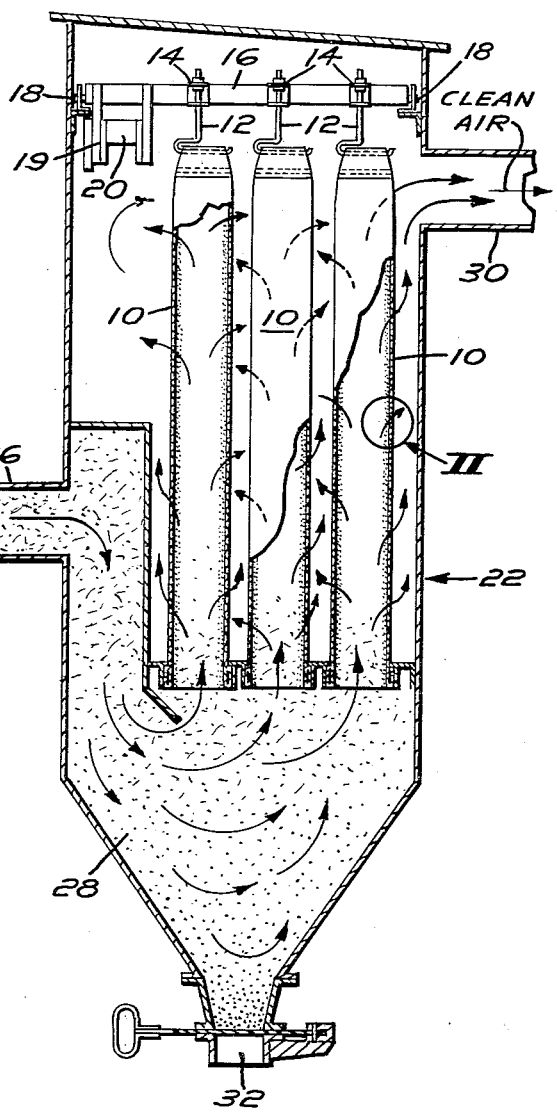
Figure 2:
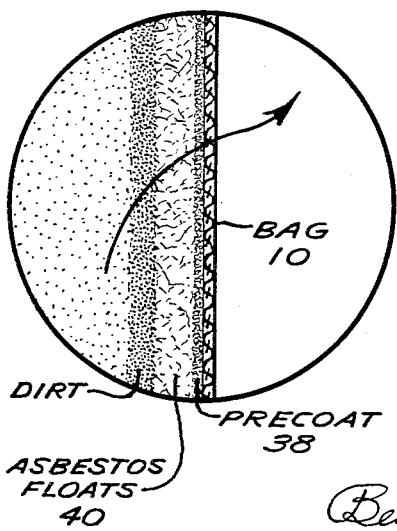

Other objects and advantages will be evident by reference to the following specification and drawing wherein:

FIG. 1 is a somewhat schematic illustration of a filtering system embodying the present invention; and FIG. 2 is a magnified sectional view taken as indicated at II on FIG. 1.

FIG. 1 of the drawing herewith illustrates a typical filter tube installation and the associated system whereas FIG. 2 illustrates only that portion of the filter device which is directly related to the features of the present invention. Thus, it will be understood that a plurality of filter tubes 10 formed of a filter fabric may be supported at their closed upper ends from hooks 12 supported on cross bars 14 which are carried on shaker rods 16 which are journalled as indicated at 18—18 on the "bag house" structure. The rods 16 are arranged to be rocked as by means of crank arms 19 engaging a push-pull member 20 which is longitudinally reciprocated by any suitable means (not shown) whenever it is necessary to "shake down" the tubes 10, as explained in my Patent No. 2,879,863.

The "bag house" enclosing the bags 10 is indicated at 22, and the air to be filtered is introduced to the system through a duct 24 leading to the intake of a fan as indicated at 25. The air then passes through a fan discharge conduit 26 into a settling hopper 28 where the larger and heavier dirt particles are dropped out. The air is then forced upwardly through the filter bags 10 and thence out by way of the duct 30 as clean, filtered air. Accumulations of dirt in the hopper 28 may be removed from time to time through the gate 32.

As previously stated, the purpose of the present invention is to alter the tenacity of the clinging characteristics exhibited by the asbestos "float" fibres relative to the filter bag fabric per se when the bags are being shaken down, so as to facilitate unloading of the air filtering pores of the fabric when needed. Hence it is no longer necessary to subject the bags to such violent shaking treatments as to damage them. To this end the present invention provides for a novel pre-treatment of the bag fabric before the asbestos "float" is applied; a cellulose material being first applied to the fabric by feeding it in an aerated condition from a hopper 34 as controlled by a "star wheel" 36 or other measuring feeder into the fan inlet. The fan discharge then carries this material up into the filter bags where it settles onto the fabric to form a coating 38 (FIG. 2). Where as various thicknesses of coatings have been found effective, by way of example I have found that a precoat as aforesaid weighing about 4 grams per square foot of fabric coated gives good results, and when this initial precoat has been evenly and properly distributed a second coat 40 of asbestos floats of the order of 36 grams per square foot may be applied in a like manner. However, it is to be understood that substantial variations in the weight ratios of the coatings and of the total weight of the dual coating may be employed, as preferred. For example, the second coat of asbestos fibres may be within the range of five to twenty times the weight of the precoat.

The system is now ready for operation, but when the air flow through the filter subsequently becomes restricted by accumulations of dust on the fabric, the fan is stopped and the mechanism causing the bars 16 to rock is operated to gently shake the bags so as to cause the cakes of dust and asbestos floats to fall free from the fabric and down into the hopper 28 for removal through the cleanout gate 32. The filter coat is then reconstructed by first applying a coating of cellulose floats followed by another coat of asbestos floats as explained hereinabove, and the filter system is then again ready for operation.

It is a particular feature of the present invention that the dual-coat filter aid structure thereof includes a bottom or first layer of "precoat" material which is entirely separate and distinct from the second or main layer; and that the first layer may be applied in ultra-thin (almost transparent deposit) form while functioning effectively for the purposes of the invention. Thus, in this manner the precoat material may be applied to prepare the surface of the tube fabric while being only thinly but uniformly distributed over the entire fabric surface; whereas when mixtures of precoat and filter aid materials are applied in similar cases the mixture attaches to the fabric in extremely uneven manner, tending to migrate toward and deposit most heavily at the top ends of the filter bags due to the conveying air current patterns interiorly of the bags. Thus, according to prior methods only uneven deposits are attainable, which of course can give only erratic filtering results; and furthermore, when such coatings become "loaded" and require shake-off they do not respond uniformly to the shake-off forces. Hence, highly undesirable quantities of residual filter cake material tend to remain on the fabric in the form of patches thereon, making it difficult to recondition the tubes properly for repetitive efficient performances.

The present invention eliminates the aforesaid difficulties and disadvantages by first applying to the fabric and extremely thin deposit of a precoat material which is especially selected for its ability to satisfactorily cling to the fabric and to provide under operative conditions a suitable bond for the next applied filter coat material, while functioning also as an effective "release" agent when the filter bags are shaken as explained hereinabove preparatory to a bag reconditioning cycle. This precoat material is not suited, for optimum results, to be applied in depth and used solely as a filtering cake; nor may it be satisfactory mixed into larger quantities of suitable filter aid material and then applied to the fabric, as explained hereinabove. It is the specific method of use of the materials as explained hereinabove that provides the critical operational effects required to obtain the combination of maximum collecting efficiency and minimum draft loss and uniform dispersion of the filtering action, along with clean "release" of the used filter cake when replacements thereof are required.

It will of course be appreciated that various suitable materials may be employed to comprise the dual-layer filtering medium of the invention. For example, any form of cellulose type fibres may be used for the precoat deposit, as distinguished for example from materials having unsatisfactory "release" characteristics, due for example to their electrostatic natures. For the second layer or "filter aid" component so-called "asbestos floats" or fibres may be employed according to the nature of the dust to be filtered; but it is significant that the present invention renders feasible in this respect the use of a filter material such as might not otherwise be tolerable due to its tendency to cling to a fabric surface when applied directly thereto.

Whereas only one form of the invention has been illustrated and described in detail hereinabove, it will be understood that various changes may be made therein without departing from the spirit of the invention or the scope of the following claims.

I claim:
1. In a filtering system, a flexible, tube-like filter device supported upon a member and adapted to be shaken for removal from time to time of filtered accumulations therefrom, said filter device comprising a fabric tube arranged for end passage thereinto of an air flow to be filtered and wherein air flow is directed therethrough, said fabric having separately air-deposited and air flow-retained thereon at the air intake side thereof a first relatively thin deposit of cellulose fibres and a second relatively thick deposit of filter aid material, the second deposit being thereby completely separated from said fabric by the first deposit, and means for periodically shaking said fabric tube for removing both deposits therefrom.
2. A filter device as claimed in claim 1 wherein the filter aid material deposit is of asbestos fibre form.
3. A filter device as claimed in claim 2 wherein the first and second deposits on the fabric are in a weight relation of about 1 to 9.
4. A filter device as claimed in claim 2 wherein the first and second deposits on the fabric are in a weight relation of between 1 to 5 and 1 to 20.
5. A filter device as claimed in claim 1 wherein the first and second deposits on the fabric are in a weight relation of about 1 to 9.
6. A filter device as claimed in claim 1 wherein the first and second deposits on the fabric are in weight relation of between 1 to 5 and 1 to 20.

References Cited in the file of this patent

UNITED STATES PATENTS

| 2,206,297 | Curley | July 2, 1940 |
| 2,383,066 | McDermott | Aug. 21, 1945 |
| 2,875,847 | Pring | Mar. 3, 1959 |

FOREIGN PATENTS

| 148,795 | Great Britain | May 12, 1921 |
| 196,160 | Great Britain | Apr. 19, 1923 |